United States Patent
Johansen

(10) Patent No.: US 9,073,047 B2
(45) Date of Patent: *Jul. 7, 2015

(54) METHOD FOR THE PREPARATION OF A CATALYSED PARTICULATE FILTER AND CATALYSED PARTICULATE FILTER

(75) Inventor: Keld Johansen, Frederikssund (DK)

(73) Assignee: Haldor Topsoe A/S, Lyngby (DK)

( * ) Notice: Subject to any disclaimer, the term of this patent is extended or adjusted under 35 U.S.C. 154(b) by 30 days.

This patent is subject to a terminal disclaimer.

(21) Appl. No.: 13/879,664

(22) PCT Filed: Nov. 1, 2011

(86) PCT No.: PCT/EP2011/005504
§ 371 (c)(1),
(2), (4) Date: Apr. 16, 2013

(87) PCT Pub. No.: WO2012/059211
PCT Pub. Date: May 10, 2012

(65) Prior Publication Data
US 2013/0210609 A1 Aug. 15, 2013

(30) Foreign Application Priority Data
Nov. 2, 2010 (DK) .............. PA 2010 00991

(51) Int. Cl.
| | | |
|---|---|---|
| B01J 21/00 | (2006.01) | |
| B01J 23/00 | (2006.01) | |
| B01J 25/00 | (2006.01) | |
| B01J 29/00 | (2006.01) | |
| B01J 23/10 | (2006.01) | |
| B01J 37/02 | (2006.01) | |
| B01J 23/30 | (2006.01) | |
| B01J 37/00 | (2006.01) | |
| F01N 3/023 | (2006.01) | |
| B01D 53/94 | (2006.01) | |

(52) U.S. Cl.
CPC ......... *B01J 37/0215* (2013.01); *B01D 53/9418* (2013.01); *B01D 53/944* (2013.01); *B01D 53/9463* (2013.01); *B01D 2255/2065* (2013.01); *B01D 2255/20738* (2013.01); *B01D 2255/20761* (2013.01); *B01D 2255/20776* (2013.01); *B01D 2255/407* (2013.01); *B01D 2255/50* (2013.01); *B01D 2255/9155* (2013.01); *B01J 23/10* (2013.01); *B01J 23/30* (2013.01); *B01J 37/0036* (2013.01); *F01N 3/023* (2013.01); *F01N 2510/065* (2013.01)

(58) Field of Classification Search
USPC .......................................... 502/304, 100, 300
See application file for complete search history.

(56) References Cited

U.S. PATENT DOCUMENTS

| | | | |
|---|---|---|---|
| 7,250,385 B1 * | 7/2007 | Ohno et al. ................... | 502/178 |
| 2005/0031514 A1 * | 2/2005 | Patchett et al. ............ | 423/239.2 |
| 2011/0176979 A1 * | 7/2011 | Alive et al. ................ | 423/213.5 |

FOREIGN PATENT DOCUMENTS

| | | |
|---|---|---|
| EP | 2 072 120 A1 | 6/2009 |
| EP | 2 108 494 A2 | 10/2009 |
| WO | WO 2008/049491 A1 | 5/2008 |

* cited by examiner

*Primary Examiner* — James McDonough
(74) *Attorney, Agent, or Firm* — Dickstein Shapiro LLP

(57) ABSTRACT

Method for the preparation of a catalysed particulate filter and a particulate filter. The method comprises the steps of a) providing a catalyst wash coat with a first catalyst active in burning off of soot and a second catalyst active in selective catalytic reduction of nitrogen oxides; b) coating a particulate filter body with the catalyst wash coat on the dispersion side and the permeate side of the filter body and within partition walls of the filter body; and c) drying and heat treating the coated filter body to obtain the catalysed particulate filter.

9 Claims, No Drawings

METHOD FOR THE PREPARATION OF A CATALYSED PARTICULATE FILTER AND CATALYSED PARTICULATE FILTER

The present invention relates to multifunctional catalysed diesel particulate filters. In particular, the invention relates to a method for the preparation of catalysed diesel particulate filters having both an activity in the removal of nitrogen oxides by the known selective catalytic reduction (SCR) process and an activity in the burning of soot having been captured on the filter.

The invention provides furthermore a catalysed filter with a catalyst being active in the SCR and a catalyst for improved burning of soot.

In addition to unburnt hydrocarbons, diesel exhaust contains, nitrogen oxides (NOx) and particulate matter. In particular NOx and particulate matter are material and chemical compounds representing a health and environmental risk and must be reduced or removed from the engine exhaust gas.

Particulate matter consists mainly of soot and is conventionally removed from the exhaust gas by passage through a filter arranged in the exhaust system of the engine.

Typically these filters are honeycomb wall flow filters, wherein the soot is captured on or in partition walls of the honeycomb filter. By time, the build-up of captured particulate matter on the walls increases the pressure drop over the filter and the particulate matter must be removed, usually by way of burning the soot. Burning off of the soot is usually accomplished passively in the presence of a soot combustion catalyst or actively by a periodically increase of the temperature of the exhaust gas.

Filters provided with a catalyst catalysing a burning off of the soot are known in the art.

Beside a particulate filter, diesel exhaust gas cleaning systems disclosed in the art comprise a catalyst unit active in the selective reduction of NOx by reaction with ammonia.

Multifunctional diesel particulate filters coated with catalysts catalysing different reactions are also known in the art.

In the known multifunctional filters the different catalysts are segmentary or zone coated in different zones of the filter.

Segmentary or zone coating of different catalysts on the filter is, however, an expensive and difficult preparation process.

This invention suggests a comparatively easier method for the preparation of particulate filers catalysed with different catalysts for the burning off of soot and a selective reduction of NOx.

Accordingly, the invention relates to a method for the preparation of a catalysed particulate filter comprising the steps of a) providing a catalyst wash coat containing a first catalyst active in burning off of soot in combination with a second catalyst active in selective catalytic reduction of nitrogen oxides;

b) coating a particulate filter body with the catalyst wash coat on the dispersion side and the permeate side of the filter body and within partition walls of the filter body; and c) drying and heat treating the coated filter body to obtain the catalysed particulate filter.

The terms "dispersion side" and "permeate side" as used herein refer both to the flow passages of the filter facing the soot containing exhaust gas and to the flow passages facing the filtrated exhaust gas, respectively.

The main advantage of the method according to the invention is that the filter can be coated with a single wash coat containing two types of catalyst catalysing different reactions. Thereby the preparation of a multifunctional catalysed filter is much improved in terms of a facilitated and cost-saving production setup. Additionally, the intimate mixture of the first and the second catalyst provides process advantages when the first catalyst presents some activity for the second reaction and the second catalyst presents some activity for the first reaction. This synergy increases the soot combustion activity and SCR activity compared to a solution with only one of the catalysts. An example of this process advantage is demonstrated when the filter has a low soot loading because then the SCR NOx removal of the optimised SCR catalyst is supplemented by the SCR activity of the soot combustion catalyst. Thus the appropriate catalyst is available in the filter where the reaction is needed, which is an improvement compared to a segmentary wash coated filters.

A further advantage of coating a filter with different types of catalysts as a mixture of catalyst particles is found in an improved heat transfer and a warm-up during a cold start due to a low thermal mass of the combined filter catalyst brick and thus makes it possible to start injection of a reductant and the SCR reaction earlier than hitherto known.

In one embodiment of the invention, the first catalyst particles active in combustion of soot with oxygen or nitrogen dioxide may comprise catalysts or catalyst precursors of one or more rare earth metal oxides. In addition to rare earth oxides, the first catalyst may further comprise zirconia, alumina, titania, silica, zeolite or combinations thereof.

The first catalyst comprises preferably cerium oxide and zirconium oxide

In yet another embodiment of the invention, the second catalyst particles in the wash coat being active in the selective catalytic reduction of NOx may comprise at least one of a zeolite, a silica aluminum phosphate, an ion exchanged zeolite, a silica aluminum phosphate optionally promoted with iron and/or copper, one or more base metal oxides and a catalyst support of at least one of cerium tungsten oxide on a titanium oxide support, an alumina support, a zirconium oxide support or a silica support.

The second catalyst comprises preferably tungsten oxide and cerium oxide supported on alumina.

In order to form the wash coat for use in the invention, the first and the second catalyst usually in particle form are milled to the required particle size and suspended in water or organic solvents, optionally with addition of binders, viscosity improvers, foaming agents or other processing aids.

The wash coat may be prepared by suspending the first and second catalyst particles in form of a single suspension or by preparing two different suspensions with the first and the second catalyst, respectively, followed by mixing the two suspensions in a volume ratio to prepare the wash coat with the required amount of the first and the second catalyst particles.

Further binders, viscosity improvers, foaming agents may be added after mixing.

The filter is then wash coated according to common practice.

In a preferred embodiment of the invention, the filter body is shaped in form of a wall flow monolith with a plurality of longitudinally expending passages formed by longitudinally extending walls bounding and defining flow passages, where the dispersion side of the passages have an open inlet end and an outlet end being plugged with plugs, and where the permeate side of the passages have an inlet end being plugged with plugs and an open outlet end.

In yet another preferred embodiment, the filter body of the above wall flow monolith is wash coated before the outlet end of the dispersion side and the inlet end of the permeation side are plugged.

The invention provides furthermore a catalysed particulate filter coated with a wash coat on its dispersion side and its permeate side and within partition walls of the filter body, said wash coat containing a first catalyst being active in burning off of soot together with a second catalyst active in a selective catalytic reduction of nitrogen oxides.

A preferred filter body for use in the invention comprises a wall flow monolith with a plurality of longitudinally extending passages formed by longitudinally extending walls bounding and defining flow passages. The inlet portion of the passages has an open inlet end and a closed outlet end, and the outlet passages have a closed inlet end and an open outlet end.

Examples of suitable filter materials for use in the invention are silicon carbide, aluminium titanate, cordierite, alumina, mullite or combinations thereof.

The amount of first catalyst on the filter is typically 10 to 100 g/l and the amount of second catalyst on the filter is typically 20 to 180 g/l. The total catalyst loading on the filter is typically in the range 40 to 200 g/l The particle sizes of both catalysts in the wash coating suspension are smaller than the mean pore size of the filter wall. But a further option is the particle size of one of the catalysts in the wash coating suspension being equal to or larger than the mean pore size of the filter wall.

EXAMPLE

A suspension of the first catalyst is in a first step prepared from a mixture of cerium nitrate and zirconium nitrate followed by a heat treatment to convert the nitrate mixture into the oxides of cerium and zirconium with a molar ratio of Ce/Zr 3:1. In a second step, a suspension of the first catalysts is prepared by mixing 40 g of the cerium oxide zirconium oxide mixture in 80 ml demineralised water. A dispersing agent Zephrym PD-7000 and an antifoam agent are added. The suspension is milled in a bead mill. The particle sizes must be lower than the mean pore diameter of the pores in the wall of the wall flow filter A suspension of the second catalyst is prepared by mixing cerium nitrate and ammonium meta tungstate solutions followed by impregnating the mixed solution on aluminium oxide particles and heat treating the particles at 550° C. for 4 hours in air. Thereby alumina particles with 10% Cerium oxide and 10% tungsten oxide are obtained. 100 g of this tungsten oxide plus cerium oxide on aluminium oxide is dispersed in 200 ml demineralised water. A dispersing agent Zephrym PD-7000 and an antifoam agent is added. The suspension is milled in a bead mill. The particle sizes must be lower than the mean pore diameter of the pores in the wall of the wall flow filter.

A suspension of the first catalyst is then mixed into the suspension of the second catalyst.

A high porosity (approximately 60%) unplugged SiC wall flow filter is then wash coated with the mixture of the first and the second catalyst and dried.

After coating, the end channels are plugged with a commercially available cement and the plugged filter is subsequently heat treated at 730° C.

The invention claimed is:

1. Method for the preparation of a catalyzed particulate filter, the method comprising the steps of:
   a) providing a single catalyst wash coat obtained from a wash coat suspension containing a first catalyst active in burning off of soot in combination with a second catalyst active in selective catalytic reduction of nitrogen oxides;
   b) coating a particulate filter body with the catalyst wash coat on the dispersion side and the permeate side of the filter body and within partition walls of the filter body; and
   c) drying and heat treating the coated filter body to obtain the catalyzed particulate filter, wherein the first or the second catalyst in the wash coat suspension has a particle size equal to or larger than the mean pore size of the filter walls.

2. The method of claim 1, wherein the second catalyst comprises at least one of a zeolite, a silica aluminum phosphate, an ion exchanged zeolite, a silica aluminum phosphate, one or more base metal oxides and a catalyst support of at least one of cerium tungsten oxide on a titanium oxide support, an alumina support, a zirconium oxide support or a silica support.

3. The method of claim 2, wherein the second catalyst comprises further a promoter of iron and/or copper.

4. The method of claim 1, wherein the first catalyst comprises zirconium oxide and/or one or more rare earth metal oxides.

5. The method of claim 4, wherein the one or more rare earth metals comprise cerium oxide.

6. The method of claim 4, wherein the first catalyst further comprises alumina, titania, silica, a zeolite or combinations thereof.

7. The method of claim 2, wherein the second catalyst comprises tungsten oxide and cerium oxide supported on alumina.

8. The method according to claim 1, wherein the filter body is shaped in form of a wall flow monolith with a plurality of longitudinally expending passages formed by longitudinally extending walls bounding and defining flow passages, where the dispersion side of the passages have an open inlet end and an outlet end being plugged with plugs, and where the permeate side of the passages have an inlet end being plugged with plugs and an open outlet end.

9. The method of claim 8, wherein the filter body of the wall flow monolith is wash coated before the outlet end of the dispersion side and the inlet end of the permeation side are plugged.

* * * * *